US012580872B2

(12) United States Patent
Doddaiah et al.

(10) Patent No.: US 12,580,872 B2
(45) Date of Patent: Mar. 17, 2026

(54) DYNAMIC QoS CHANGES

(71) Applicant: Dell Products L.P., Round Rock, TX (US)

(72) Inventors: Ramesh Doddaiah, Westborough, MA (US); Daniel L. Hamlin, Round Rock, TX (US); Anup Keshwani, Bangalore (IN); Malathi Ramakrishnan, Madurai (IN)

(73) Assignee: Dell Products L.P., Round Rock, TX (US)

( * ) Notice: Subject to any disclaimer, the term of this patent is extended or adjusted under 35 U.S.C. 154(b) by 37 days.

(21) Appl. No.: 18/537,667

(22) Filed: Dec. 12, 2023

(65) Prior Publication Data

US 2025/0193129 A1 Jun. 12, 2025

(51) Int. Cl.
*H04L 47/80* (2022.01)
*H04L 47/70* (2022.01)
*H04L 47/83* (2022.01)

(52) U.S. Cl.
CPC .......... *H04L 47/805* (2013.01); *H04L 47/826* (2013.01); *H04L 47/83* (2022.05)

(58) Field of Classification Search
CPC ...... H04L 47/805; H04L 47/826; H04L 47/83
See application file for complete search history.

(56) References Cited

U.S. PATENT DOCUMENTS

| | | | | |
|---|---|---|---|---|
| 5,884,037 | A * | 3/1999 | Aras | H04L 47/741 |
| | | | | 709/226 |
| 8,417,814 | B1 * | 4/2013 | Hartmann | G06F 9/5011 |
| | | | | 709/225 |
| 2001/0013008 | A1 * | 8/2001 | Waclawski | G06F 11/3452 |
| | | | | 714/E11.197 |
| 2013/0326061 | A1 * | 12/2013 | Li | H04L 12/1407 |
| | | | | 709/224 |
| 2016/0219525 | A1 * | 7/2016 | Kumar | H04W 52/0254 |
| 2019/0028407 | A1 * | 1/2019 | Perumal Vijayan | H04L 67/61 |
| 2021/0144517 | A1 * | 5/2021 | Guim Bernat | H04L 47/781 |
| 2021/0266358 | A1 * | 8/2021 | Cady | G06N 3/08 |
| 2022/0171653 | A1 * | 6/2022 | Rj | G06F 9/505 |
| 2022/0188175 | A1 * | 6/2022 | Pokharna | G06F 11/3692 |
| 2023/0224258 | A1 * | 7/2023 | Karacali-Akyamac | |
| | | | | H04L 47/801 |
| | | | | 709/226 |
| 2024/0129027 | A1 * | 4/2024 | Bode | H04B 7/18517 |
| 2024/0205165 | A1 * | 6/2024 | Smith | H04L 41/16 |

* cited by examiner

*Primary Examiner* — Chris Parry
*Assistant Examiner* — Steven C Nguyen
(74) *Attorney, Agent, or Firm* — Jackson Walker L.L.P.

(57) ABSTRACT

An information handling system may include at least one processor and a network interface adapter. The information handling system may be configured to: couple to a plurality of client systems via the network interface adapter; implement a quality of service (QoS) policy for each client system; adjust the QoS policies based on predictions regarding resource utilization for resources of the information handling system and input/output (I/O) demands associated with each client system during specified time windows; and service requests from the client systems in accordance with the adjusted QoS policies.

12 Claims, 5 Drawing Sheets

DYNAMIC QoS CHANGES

TECHNICAL FIELD

The present disclosure relates in general to information handling systems, and more particularly to dynamic quality of service (QoS) policies in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well as other contexts), information handling systems may execute virtual machines (VMs) for various purposes. A VM may generally comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

In both HCI and non-HCI deployments, a server may provide services to several clients. It may also implement a QoS policy that determines the level of service that is to be provided to each client at any given time. For example, the QoS policy may dictate how quickly the server should respond to a request from the client (e.g., a maximum allowable latency such as several milliseconds down to a few microseconds or less), the amount of compute or networking resources to be dedicated to the client, etc.

In existing implementations, the QoS policy for a server is typically set manually, which is inconvenient for a variety of reasons. For example, with a large number of clients, manually setting QoS policies is impractical. Further, QoS may need to change over time, and so a static policy is not ideal.

Embodiments of this disclosure thus provide many improvements in the field of dynamic QoS policies.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with management of QoS policies may be reduced or eliminated.

In accordance with embodiments the present disclosure, an information handling system may include at least one processor and a network interface adapter. The information handling system may be configured to: couple to a plurality of client systems via the network interface adapter; implement a quality of service (QoS) policy for each client system; adjust the QoS policies based on predictions regarding resource utilization for resources of the information handling system and input/output (I/O) demands associated with each client system during specified time windows; and service requests from the client systems in accordance with the adjusted QoS policies.

In accordance with these and other embodiments of the present disclosure, a method may include an information handling system coupling to a plurality of client systems via a network interface adapter thereof; the information handling system implementing a quality of service (QoS) policy client system; the information handling system adjusting the QoS policies based on predictions regarding resource utilization for resources of the information handling system and input/output (I/O) demands associated with each client system during specified time windows; and the information handling system servicing requests from the client systems in accordance with the adjusted QoS policies.

In accordance with these and other embodiments of the present disclosure, an article of manufacture may include a non-transitory, computer-readable medium having computer-executable instructions thereon that are executable by a processor of an information handling system for: coupling to a plurality of client systems via a network interface adapter thereof; implementing a quality of service (QoS) policy for each client system; adjusting the QoS policies based on predictions regarding resource utilization for resources of the information handling system and input/output (I/O) demands associated d with each client system during specified time windows; and servicing requests from the client systems in accordance with the adjusted QoS policies.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which reference numbers indicate like features, and wherein.

DETAILED DESCRIPTION

Figure 1:
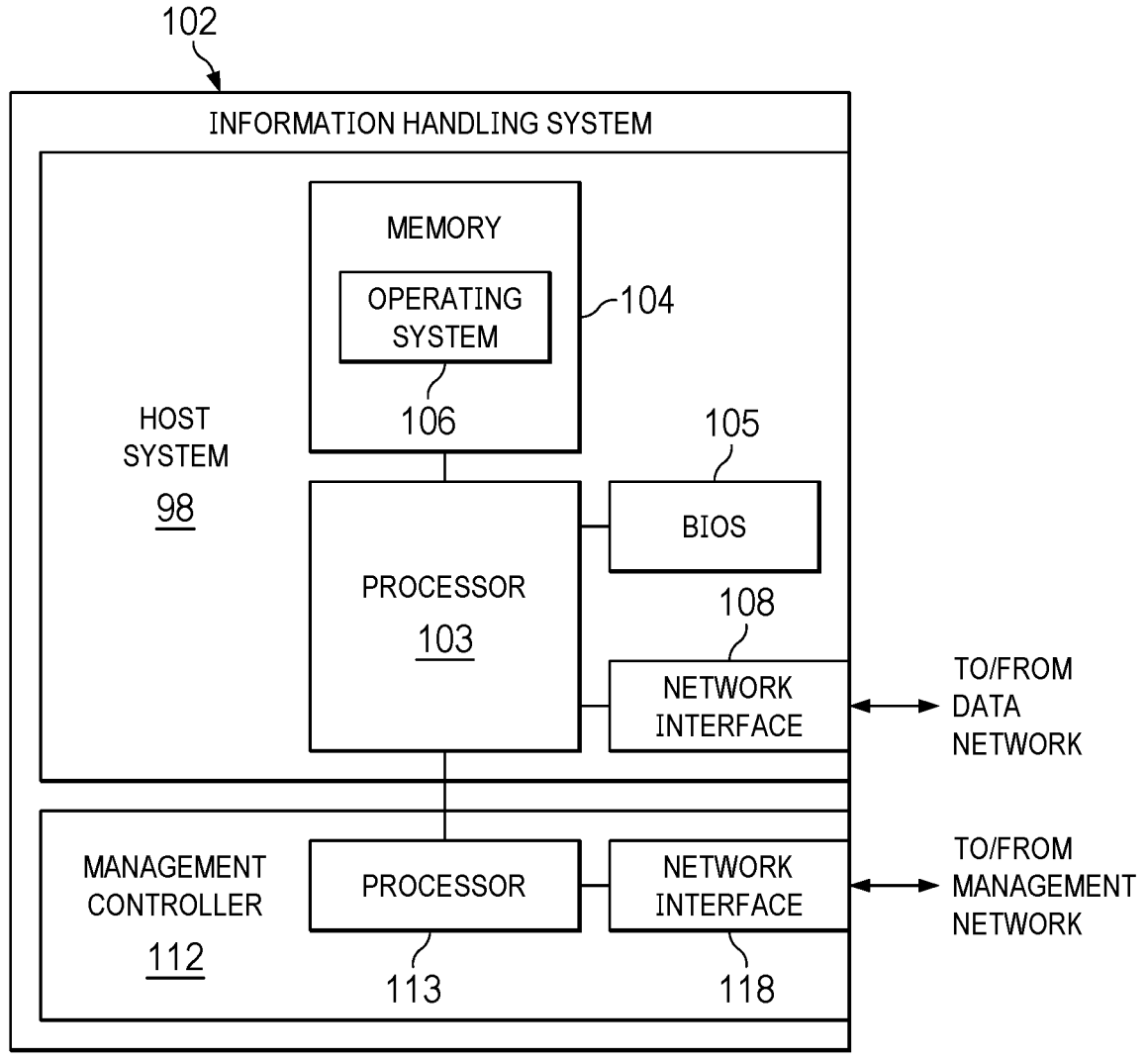
FIG. 1 illustrates a block diagram of an example information handling system, in accordance with embodiments of the present disclosure.

Preferred embodiments and their advantages are best understood by reference to FIGS. 1 through 5, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality f servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions for aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure provide improvements in the management of QoS policies provided by information handling system 102 (e.g., an edge server or edge gateway) in serving other information handling systems 102 (e.g., edge nodes). It should be noted that while the scenario of an edge deployment is discussed in detail herein for the sake of concreteness, other embodiments are also specifically contemplated within the scope of this disclosure.

Information handling system 102 may be an edge server that provides services to edge clients such as edge compute endpoints. Embodiments of this disclosure use predictive techniques to provide dynamic QoS changes based on the workload of the clients. For example, when a client system is very busy, it may need responses from the server very quickly, and so a high QoS level may be appropriate. When the client is less busy, a lower QoS level may be sufficient, freeing up the server's resources for more important tasks.

In particular, reinforcement-learning-based policies may be used to dynamically configure the server's QoS policy for each connected device as needed to improve latency and input/output operations per second (IOPS).

Each edge endpoint device may belong to one or more different categories of potential QoS levels (which may be designated numerically and/or with words such as Diamond, Gold, Silver, Bronze, etc., in terms of decreasing QoS or increasing latency allowance). Each edge device may also be classified as having either a hard or a soft QoS policy. Edge devices with a hard QoS policy will not have their QoS dynamically adjusted according to this implementation. Only the edge devices that have a soft QoS policy will have their QoS level updated on the fly in accordance with a defined QoS policy.

CPU, memory, utilization, and other fabric, disk relevant information may be collected at the edge server (e.g., once per second), and a time series analysis may be built. Forecasting may be conducted using autoregressive integrated moving average (ARIMA) methods.

For example, the incoming arrival rate of IOs for each edge endpoint may be modeled using ARIMA methods. For each edge device, the top N time windows are determined during which the incoming arrival IOs are predicted to be high, and the edge server's CPU, memory, fabric, and disk utilizations are predicted to be low (or vice versa). During these time windows, a QoS policy may be built to gradually increase (or decrease) the QoS level for edge devices that have a soft policy (e.g., using stochastic gradient descent), as appropriate.

QoS can be changed on the fly to different class levels, and the edge server's CPU, memory, fabric, and disk utilizations may be measured. If these resource utilizations do not indicate a problem (e.g., based on some user-defined utilization threshold), then this can be used to generate an appropriate QoS policy to recommend to the administrator.

One embodiment may recommend a reinforcement-learning-based Top-P QoS policy to the administrator at different time windows. ARIMA-based time series analysis and forecasting solutions may be used to take proactive actions dynamically if the administrator wants to automatically apply the learned QoS policy. The administrator may also override some or all of the dynamic analysis to improve the results.

Figure 2:
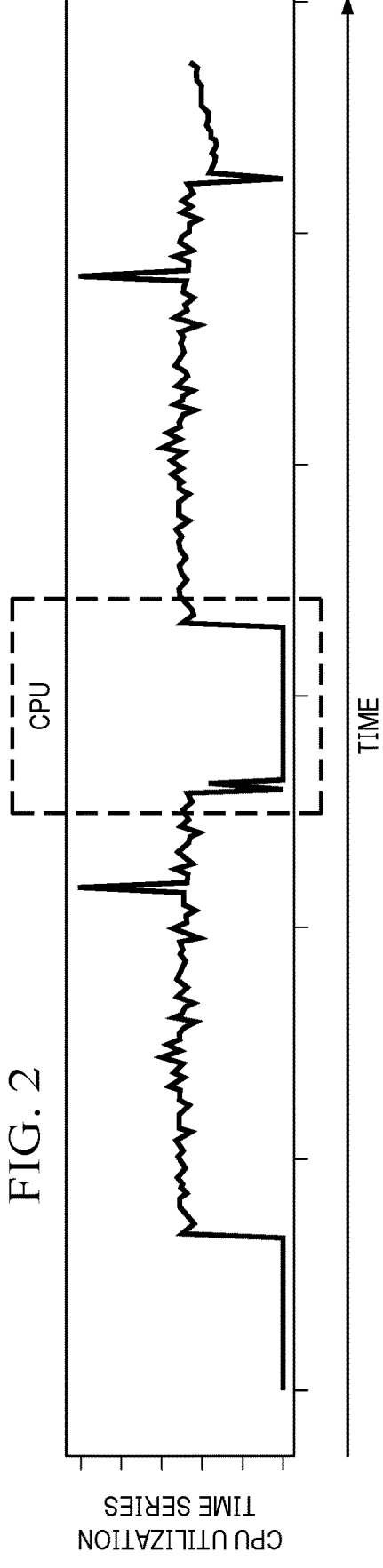
FIG. 2 illustrates a time series graph of CPU utilization in an edge server, in accordance with embodiments of the present disclosure.

FIG. 2 provides an example of time series data for CPU utilization at an edge server, indicating a time window during which utilization is low. Embodiments may forecast several such low-utilization time windows on edge servers by leveraging ARIMA time series methods on historical data. ARIMA methods may model seasonality and trends, ignoring any burst anomalies to find better time windows.

Figure 3:
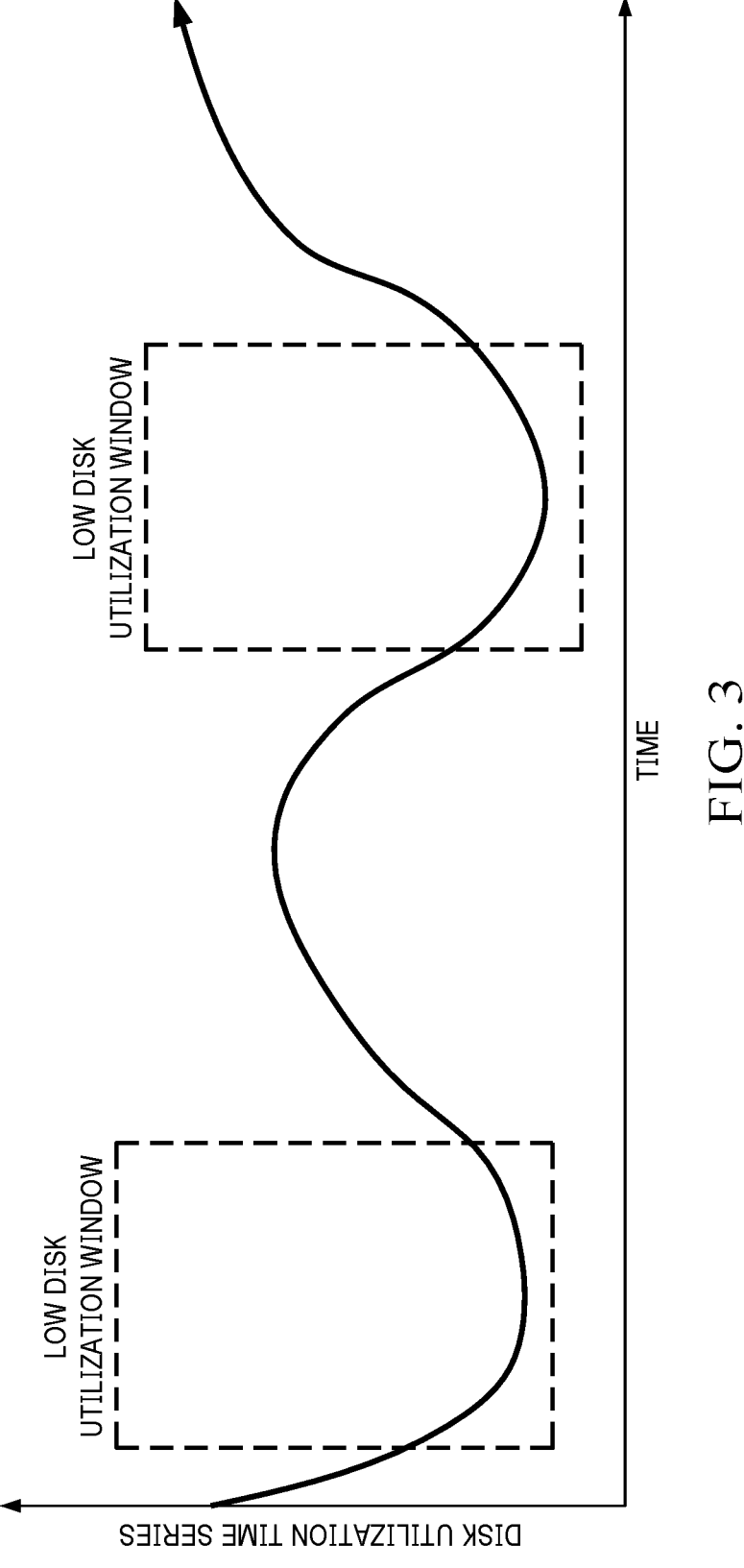
FIG. 3 illustrates a time series graph of disk utilization in an edge server, in accordance with embodiments of the present disclosure.

FIG. 3 similarly provides an example of time series data for disk utilization, indicating two time windows during which utilization is low. Similar data to that in FIGS. 2 and 3 may be used to predict suitable time windows for memory, disk, network fabric utilization, and any other relevant figures of merit.

Figure 4:
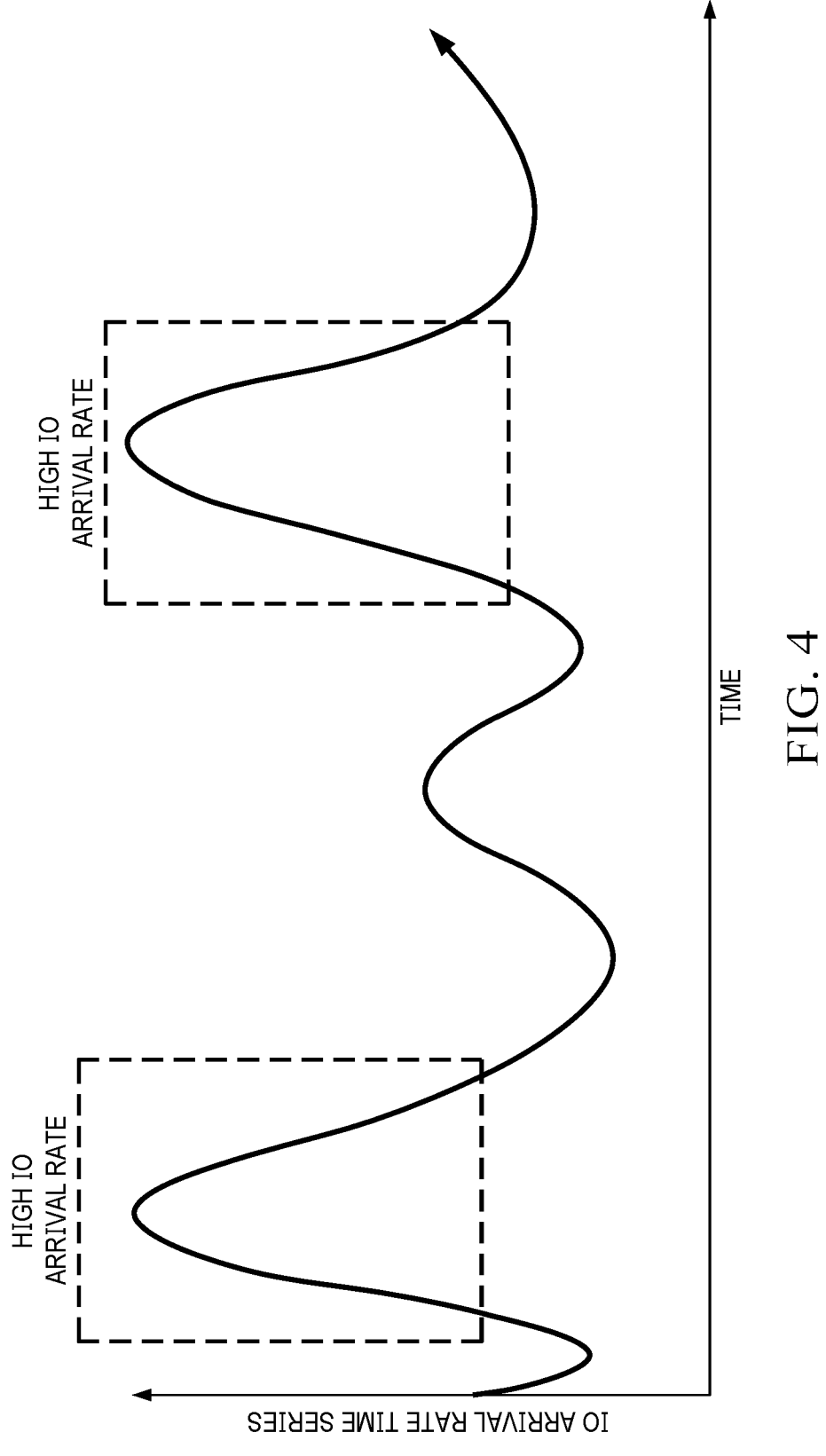
FIG. 4 illustrates a time series graph of I/O arrival rate from an edge endpoint to an edge server, in accordance with embodiments of the present disclosure.

Thus FIGS. 2 and 3 illustrate data relating to the availability of resources at an edge server. FIG. 4, in contrast, provides an example of the demands being made on the edge server by an edge node. In particular, FIG. 4 shows a time series of I/O arrival rate associated with a particular edge endpoint, highlighting the high-demand windows during which I/O arrival rates are high and for which a higher QoS policy might be appropriate.

Figure 5:
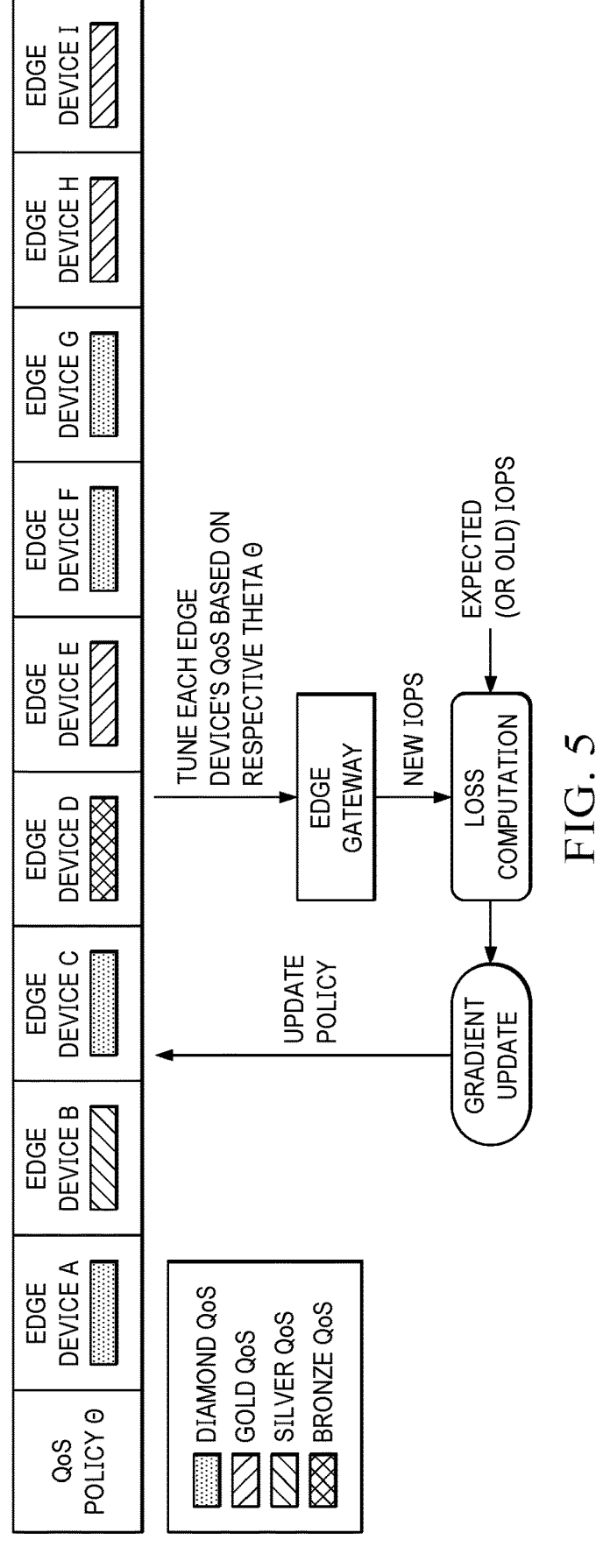
FIG. 5 illustrates an example of QoS policy tuning, in accordance with embodiments of the present disclosure.

FIG. 5 illustrates one example of using a stochastic gradient descent method to generate QoS policy. The corresponding method may operate as follows.

1. Theta ($\Theta$) may take on a random uniform distribution from 0 to 1.
2. Each $\Theta$ may be perturbed to tune respective edge devices.
3. New IOPs may be computed using the new QoS changes.
4. Root mean square (RMS) error between the new IOPs and the old IOPs may be used to compute loss.
5. The gradient may be calculated, and the policy may be updated with new values.
6. This method may be run for M epochs to reduce the loss function.
7. Finally, a policy may be generated for the forecasted time window.

For example, a pseudocode method may be as follows.

1. Input←current policy, response time, and IOPs
2. Output←QoS policy
3. $\Theta$←random uniform (low=0, high=1)
4. For epoch in range (epochs): do
   A. Replacement←{Diamond, Gold, Silver, Bronze . . . }
   B. New policy←$\odot$+(1−$\Theta$) $\odot$ replacement
   C. New IOPs←after applying new policy
   D. Loss {(response time, IOPs); $\Theta$}←mean square error (normalized old IOPs & RT, new IOPs & RT)
   E. $\Theta$←$\Theta$−$\nabla$*small step
   F. Update current policy based on stochastic gradient descent loss
   G. Clamp ($\Theta$, low=−1, high=1)
5. End For This method may thus learn the QoS policy based on the expected RT and IOPs. Different QoS policies may also be learned for different time windows. A customer may provide the expected RT and IOPs service level objective as an input, so that the method may learn a better QoS policy.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a network interface adapter;
   wherein the information handling system is an element of a hyper-converged infrastructure (HCI) system and is configured to:
      couple to a plurality of client systems via the network interface adapter;
      implement a quality of service (QoS) policy for each client system;
      track resource utilization for resources of the information handling system including CPU utilization, disk utilization, and input/output (I/O) demands associated with each client system;
      perform an autoregressive integrated moving average (ARIMA) analysis of the resource utilization to determine predicted resource utilizations for each client system during specified time windows;
      adjust the QoS policies based on the predicted resource utilizations; and
      service requests from the client systems in accordance with the adjusted QoS policies.

2. The information handling system of claim 1, wherein the client systems are edge endpoints of the HCI system.

3. The information handling system of claim 1, wherein the QoS policies are adjusted such that higher QoS levels are associated with time windows in which resource utilization is predicted to be low.

4. The information handling system of claim 1, wherein the QoS policies are adjusted such that higher QoS levels are associated with time windows in which I/O demands are predicted to be high.

5. A method comprising:
   an information handling system that is an element of a hyper-converged infrastructure (HCI) system coupling to a plurality of client systems via a network interface adapter thereof;
   the information handling system implementing a quality of service (QoS) policy for each client system;
   the information handling system tracking resource utilization for resources of the information handling system including CPU utilization, disk utilization, and input/output (I/O) demands associated with each client system;

the information handling system performing an autoregressive integrated moving average (ARIMA) analysis of the resource utilization to determine predicted resource utilizations for each client system during specified time windows;

the information handling system adjusting the QoS policies based on the predicted resource utilizations; and the information handling system servicing requests from the client systems in accordance with the adjusted QoS policies.

6. The method of claim 5, wherein the client systems are edge endpoints of the HCI system.

7. The method of claim 5, wherein the QoS policies are adjusted such that higher QoS levels are associated with time windows in which resource utilization is predicted to be low.

8. The method of claim 5, wherein the QoS policies are adjusted such that higher QoS levels are associated with time windows in which I/O demands are predicted to be high.

9. An article of manufacture comprising a non-transitory, computer-readable medium having computer-executable instructions thereon that are executable by a processor of an information handling system that is an element of a hyperconverged infrastructure (HCI) system for:

coupling to a plurality of client systems via a network interface adapter thereof;

implementing a quality of service (QoS) policy for each client system;

tracking resource utilization for resources of the information handling system including CPU utilization, disk utilization, and input/output (I/O) demands associated with each client system;

performing an autoregressive integrated moving average (ARIMA) analysis of the resource utilization to determine predicted resource utilizations for each client system during specified time windows;

adjusting the QoS policies based on the predicted resource utilizations; and servicing requests from the client systems in accordance with the adjusted QoS policies.

10. The article of claim 9, wherein the client systems are edge endpoints of the HCI system.

11. The article of claim 9, wherein the QoS policies are adjusted such that higher QoS levels are associated with time windows in which resource utilization is predicted to be low.

12. The article of claim 9, wherein the QoS policies are adjusted such that higher QoS levels are associated with time windows in which I/O demands are predicted to be high.

* * * * *